May 2, 1967 D. M. L. GRIFFITHS 3,316,989
MOVING CONVEYOR LOAD SCALES
Filed June 13, 1966 2 Sheets-Sheet 1
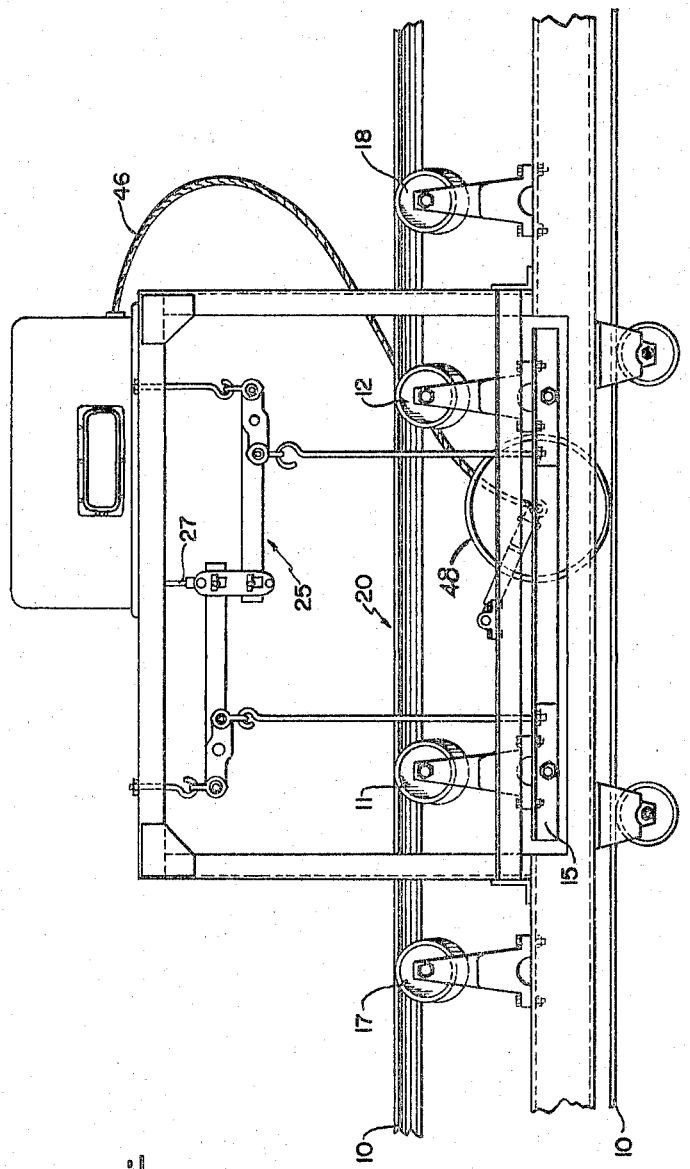
INVENTOR
DAVID M.L. GRIFFITHS
BY
Fetherstonhaugh & Co.
ATTORNEYS

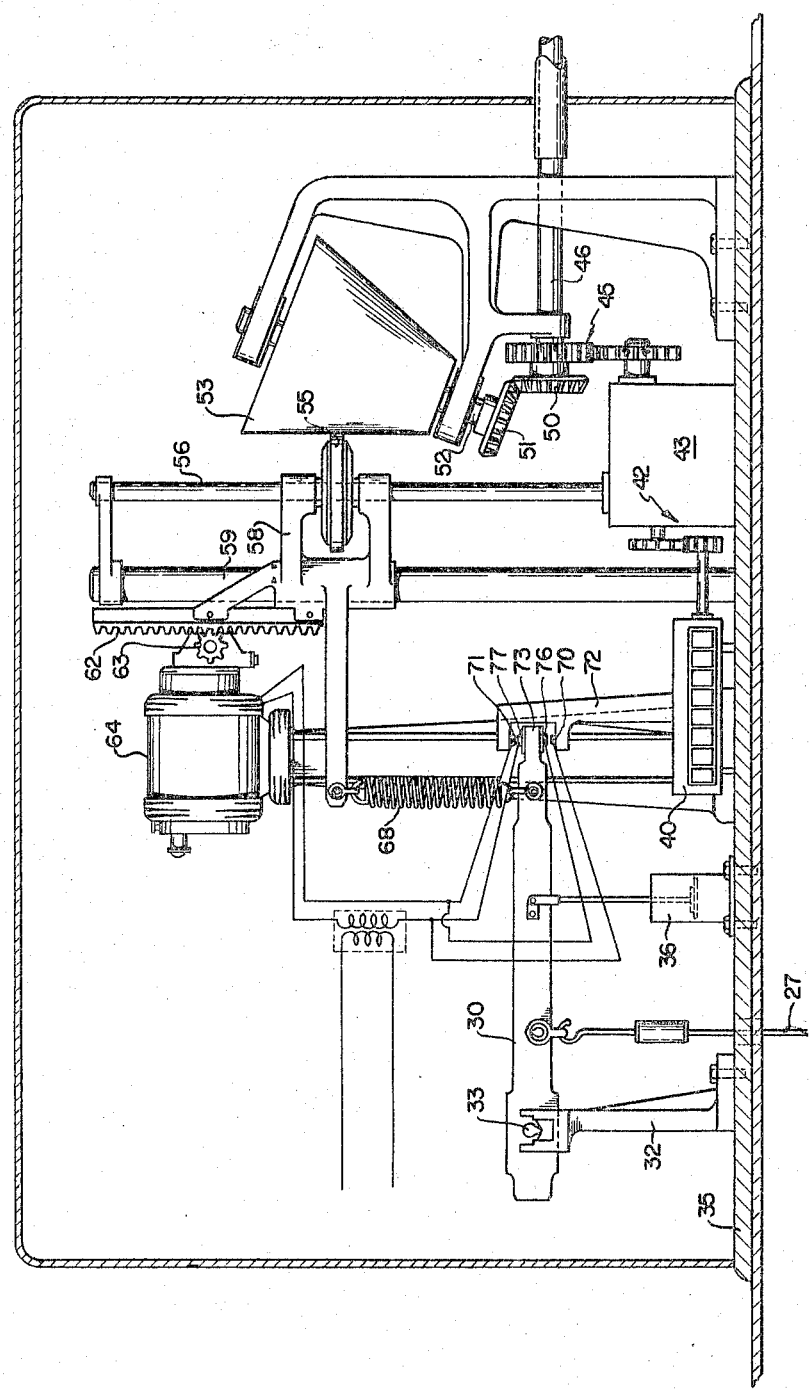

United States Patent Office 3,316,989
Patented May 2, 1967

3,316,989
MOVING CONVEYOR LOAD SCALES
David M. L. Griffiths, 1316 W. 11th Ave., Vancouver,
British Columbia, Canada
Filed June 13, 1966, Ser. No. 557,139
13 Claims. (Cl. 177—16)

This invention relates to apparatus for continuously weighing the load at a predetermined point on a moving conveyor.

Apparatus for continuously weighing the load on moving conveyors is in existence, as indicated in United States Patent No. 2,301,177, dated Nov. 10, 1942, and the main object of the present invention is the provision of apparatus of this nature which is a definite improvement over the apparatus of the prior art.

In the apparatus of the prior art, the scale beam has contacts which are adapted to engage upper and lower contacts mounted on a movable carriage which is shifted up and down by a reversible electric motor. If the load on the conveyor is increased, the scale beam is moved to cause one of its contacts to engage one of the contacts of the carrier, and this causes the motor to operate to shift the carrier to separate these contacts. If the load continues to increase, this process is repeated until the increase ceases. As the load lightens on the conveyor, the other contact of the scale beam engages the other contact of the carrier to cause the motor to move the carrier in the opposite direction. This also is repeated until the load ceases to get less on the conveyor. As a result of this, during the increasing and decreasing of the conveyor load, the end of the scale beam with the contacts thereof can move a fair distance, for example, about four inches. The weighing frame over which the load conveyor travels is connected to the scale beam through a compound lever system near the fulcrum point of said beam. In the example under consideration, the point of the beam to which the weighing frame is attached moves about one quarter of the distance of travel of the contacts, or about one inch. This movement is transmitted through the levers to the weighing frame and results in about one quarter inch of movement of said frame and the portion of the conveyor that travels over it.

When there is no load on the belt, the portion of it travelling over the weighing frame travels over said frame in a convex curve, but when under maximum load, the conveyor has a concave curve over the frame. Thus, the tension of the belt during the convex curve adds to the indicated load, while the tension during the concave curve detracts from the indicated load. In other words, an increase or decrease of the load on the portion of the conveyor approaching and/or leaving the weighing frame influences the indication of the load on the frame thereby either giving the higher or lower reading than there should be. Therefore, for a given load situation, the scale of the prior apparatus is calibrated for a predetermined average load. The scale functions properly when the load is near the predetermined average, but when the load goes above or below it, the reading is inaccurate, and the inaccuracy increases as the load moves away from said average. In other words, if the load on the conveyor is not maintained at a constant, the weighing is very inaccurate, and for most operations, it is impossible to prevent variations in the load. With most conveyors, there are periods when there is little load on the conveyor, and other periods when it is carrying a relatively heavy load.

The present conveyor load scales overcomes this disadvantage since it includes means for limiting the movement of the scale beam contacts to a very small movement, something of the order of $\frac{1}{32}$ inch. After each such movement, the beam is returned to a neutral position so that it never travels more than this small distance from its normal or neutral position. The beam load point moves $\frac{1}{4}$ of the contact movement or about $\frac{1}{128}$ inch. This movement is transmitted through the compound lever system so that the weighing frame and conveyor are moved about $\frac{1}{512}$ inch. The effect of this minute measurement on the tension of the conveyor is negligible and therefore the problems which resulted from changes in the tension of the conveyor have been eliminated. The beam tip or the contacts thereof never move more than $\frac{1}{32}$ inch. Therefore, the scale can be calibrated for maximum and minimum load and it gives a true reading for any intermediate load since the scale is influenced by changes in the load only as the conveyor tension remains substantially constant. The portion of the conveyor travelling over the weighing frame is kept substantially straight, it is not moved upwardly or downwardly so that load or lack of load on the conveyor approaching the weighing frame does not interfere with the indication of the weighing frame does not interfere with the indication of the weight of the load on the belt travelling over the weighing frame. In other words, the present apparatus eliminates the effect of conveyor tension on the weighing apparatus.

Apparatus according to the present invention includes a fulcrumed scale beam to which is operatively connected a weighing frame having spaced rollers over which a conveyor belt runs when the apparatus is in operation, a load weight accumulator, and a variable speed drive for operating the accumulator relative to the speed of the conveyor, a reversible electric motor connected to the variable speed drive to increase and decrease the speed of the accumulator in proportion to increase and decrease of the conveyor load on the weighing frame, resilient means connected to the variable speed drive and the scale beam to counterbalance the conveyor load, and switch means for controlling the motor closably by a very small movement of the beam as the conveyor load increases and decreases to cause the motor to operate the variable speed drive respectively to increase and decrease the speed of operation of the accumulator, said resilient means being moved by the variable speed drive to move the beam to open the switch means immediately after each change in the conveyor load.

A preferred form of conveyor load scales is diagrammatically illustrated in the accompanying drawings, in which, FIGURE 1 is an elevation of a conveyor and load weighing apparatus therefor, and FIGURE 2 is an enlarged elevational view of the weighing apparatus itself.

Referring to the drawings, 10 is an endless load conveyor belt, the load bearing portion of which travels over spaced rollers 11 and 12 mounted on a weighing frame 15. It is preferable to provide idler rollers 17 and 18 over which the conveyor belt travels before and after rollers 11 and 12, respectively. The section 20 of belt 10 extending between rollers 11 and 12 is kept substantially horizontal.

Weighing frame 15 is connected by a compound lever system generally designated by the numeral 25 to a rod 27 which, in turn, is connected at its upper end to a scale beam 30 mounted at one end on a standard 32 by means of a fulcrum 33. Standard 32 projects upwardly from a suitable base 35. If desired, a dash-pot 36 mounted on base 35 may be provided for beam 30.

A continuous tonnage register or accumulator of known construction is mounted on base 35. This accumulator is such as to register various units of tonnage carried by the conveyor belt per hour or any other desired unit of time. Register or accumulator 40 is driven through gearing 42 by a differential 43. This type of differential is well known in this art and does not need detailed description herein. Differential 43 is driven by gears 45 in the known manner, such gears being rotated by a flexible drive shaft 46, the opposite end of which is turned by conveyor belt 10 in any desired manner, such as by means of a traction drum 48 riding on a portion of the belt.

A variable speed drive is also provided for differential 43. This is accomplished by meshing gears 50 and 51, gear 50 being rotated by flexible shaft 46, and gear 51 being mounted on a shaft 52 projecting from the small end of a driving cone 53. A rubber wheel 55 slidably mounted on and keyed to a shaft 56 rotatably engages the surface of cone 53. Shaft 56 projects from and is part of differential 43. Wheel 55 is shifted up and down shaft 56 by a carrier 58 slidably mounted on a vertical support 59 extending upwardly from base 35, said carrier being slidably mounted for vertical movement. A rack 62 is connected to carrier 58 and extends upwardly therefrom, said rack meshing with a pinion 63 which is rotated by a reversible electric motor 64.

When motor 64 turns pinion 63 in one direction, carrier 58 is moved upwardly to shift wheel 55 towards the large end of cone 53, thereby increasing the speed of rotation of said wheel and shaft 56. When the motor turns pinion 63 in the opposite direction, carrier 58 is moved downwardly to shift wheel 55 towards the lower end of cone 53 to reduce the speed of shaft 56.

A spring 68 is connected at its lower end to beam 30 near the outer or free end of the latter, while the upper end of said spring is suitably connected to carrier 58 of the variable speed drive. Spring 68 counterbalances the conveyor load on weighing frame 15.

Suitable switching means is provided at scale beam 30 for causing motor 64 to rotate in opposite directions under increases and decreases in the conveyor load on weighing frame 15. Spring 68 normally maintains beam 30 in a neutral position. The switching means is such that when the beam is moved out of its neutral position by an increase in the conveyor load, motor 64 operates to raise carrier 58 and thereby return the beam to its neutral position through spring 68. At the same time, wheel 55 is moved to a larger diameter of driving cone 53 so that the speed of rotation of shaft 56 is increased, thereby increasing the speed of operation of accumulator 40. When the conveyor load decreases, spring 68 moves the beam out of its neutral position to cause the switching means to operate motor 64 in the opposite direction, thereby moving carrier 58 downwardly and returning the beam to its neutral position. This moves wheel 55 to a smaller diameter of cone 53, decreasing the speed of shaft 56 and therefore the speed of operation of accumulator 40.

In this example, the switching means comprises stationary contacts 70 and 71 carried by a bracket 72 and mounted immediately below and above a lug 73 projecting outwardly from the free end of beam 30, and contacts 76 and 77 on said lug which are spaced slightly from contacts 70 and 71, respectively, when beam 30 is in its neutral position. The spacing of these contacts is such that the total movement of the outer end of the scale beam is something of the order of $\frac{1}{32}$ inch. Contacts 70, 71, 76 and 77 are in the circuits of electric motor 64 so that when contacts 70 and 76 are in engagement, the motor is operated to raise carrier 58, and when contacts 71 and 77 are in engagement, the motor lowers this carrier.

The operation of this apparatus is quite simple. When the load on section 20 of belt 10 increases, weighing frame 15 moves downwardly to move scale beam 30 in the same direction to close contacts 70 and 76. This energizes motor 64 to raise carrier 58. This pulls spring 68 upwardly and as soon as the tension of the spring counterbalances the increased conveyor load, beam 30 is returned to its neutral position. If the conveyor load continues to increase, this operation is repeated until the increase stops. On the other hand, if the load on belt section 20 decreases, spring 68 moves beam 30 and weighing frame 15 upwardly. This closes contacts 71 and 77 to energize motor 64 to lower carrier 58, relaxing spring 68 sufficiently to permit beam 30 to return to its normal position. This operation continues as long as the belt load continues to decrease. It will be noted that no matter how much the belt load increases or decreases, the outer end of scale beam 30 moves only slightly, and each time there is a change in the load, carrier 58 is shifted and the beam returned to its neutral position. As wheel 55 moves towards and away from the large end of driving cone 53, the speed of operation of accumulator 40 is increased or decreased, respectively, thereby indicating and accumulating the increased or decreased conveyor load.

With this apparatus, the slightest change of load on conveyor belt section 20 causes scale beam 30 to move, but the latter is immediately returned to its neutral position while the accumulator continues to operate in accordance with the new load. Thus, belt section 20 never moves materially above or below its normal horizontal plane. As a result of this, changes in the conveyor load approaching or leaving weighing frame 15 do not materially influence the weighing of the conveyor load on said weighing frame.

The advantage of the present invention results from the fact that the portion of belt 10 extending between rollers 17 and 18 is kept substantially straight or horizontal at all times, in which case the belt tension over the weighing platform remains substantially constant. With the prior art applications, the portions of the belt between rollers 17 and 18 is maintained on a convex curve when there is no load thereon, and it changes to a concave curve as the load increases. It is obvious, that when this belt portion is under maximum load, the belt tension helps to lift or support the load so that the indicated load is less than the load actually is. As the load lessens, this discrepancy decreases, and when the load drops to the point where the belt portion starts to assume a convex curve, the belt tension begins to add to the indicated load. As a result, the prior art apparatus is balanced for a particular average load, but when the load goes above or below the average, a false load indication is given.

What I claim as my invention is:

1. In conveyor load weighing apparatus including a fulcrumed scale beam normally in a neutral position and to which is operatively connected a weighing frame having spaced rollers over which a conveyor belt runs when the apparatus is in operation, a load weight accumulator, a variable speed drive for the accumulator, said variable speed drive being driven in accordance with the speed of the conveyor, a reversible electric motor connected to the variable speed drive to operate the latter to increase and decrease the speed of operation of the accumulator as the load on the conveyor belt travelling over the weighing frame increases and decreases, resilient means connected to the variable speed drive and to the scale beam to counterbalance the conveyor load on the weighing frame, and switch means for controlling the motor closable by a very small movement of beam from its neutral position as the conveyor load increases and decreases to cause the motor to operate the variable speed drive respectively to increase and decrease the speed of operation of the accumulator, said resilient means being moved by said variable speed drive to move the beam back to its normal position to open the switch means immediately after each change in the conveyor load.

2. Conveyor load weighing apparatus as claimed in claim 1 in which said variable speed drive comprises a driving cone rotated in accordance with the speed of the conveyor and a driven wheel for operating the accumulator and rotatably engaging said cone and shiftable over the cone surface to increase and decrease the speed of operation of the accumulator, means operated by said motor and connected to said wheel for shifting the latter over the cone surface axially of the cone, said resilient means being connected to the wheel, and said motor shifting said wheel over the cone surface.

3. Conveyor load weighing apparatus as claimed in claim 2 in which said switch means comprises a lug projecting from the beam and spaced from the fulcrum thereof, a contact on each of two opposite faces of the lug, and a stationary motor contact normally spaced slightly from each lug contact and in circuit with the motor, said motor contacts being adapted to cause the motor to operate in opposite directions when the motor contacts are respectively engaged by the lug contacts to shift the wheel over the cone surface.

4. In conveyor load weighing apparatus including a fulcrumed scale beam normally in a neutral position and to which is operatively connected a weighing frame having spaced rollers over which a conveyor belt runs when the apparatus is in operation, a load weight accumulator, and a variable speed drive for operating the accumulator relative to the speed of the conveyor; a reversible electric motor connected to the variable speed drive to increase and decrease the speed of the accumulator in proportion to increase and decrease of the conveyor load on the weighing frame, resilient means connected to the variable speed drive and the scale beam to counterbalance said conveyor load, and switch means for controlling the motor closable by a very small movement of beam from its neutral position as the conveyor load increases and decreases to cause the motor to operate the variable speed drive respectively to increase and decrease the speed of operation of the accumulator, said resilient means being moved by said variable speed drive to move the beam back to its normal position to open the switch means immediately after each change in the conveyor load.

5. Conveyor load weighing apparatus as claimed in claim 4 in which said switch means comprises a lug projecting from the beam and spaced from the fulcrum thereof, a contact on each of two opposite faces of the lug, and a stationary motor contact normally spaced slightly from each lug contact and in circuit with the motor, said motor contacts being adapted to cause the motor to operate in opposite directions when the motor contacts are respectively engaged by the lug contacts and thereby cause the accumulator speed to increase and decrease as the conveyor load respectively increases and decreases.

6. Conveyor load weighing apparatus as claimed in claim 4 in which said variable speed drive is movable in two directions for operating the accumulator to increase and decrease the speed of the accumulator, said electric motor being connected to the variable speed drive selectively to move said drive in said two directions in proportion to increase and decrease of the conveyor load on the weighing frame.

7. Conveyor load weighing apparatus as claimed in claim 6 in which said switch means comprises a lug projecting from the beam and spaced from the fulcrum thereof, a contact on each of two opposite faces of the lug, and a stationary motor contact normally spaced slightly from each lug contact and in circuit with the motor, said motor contacts being adapted to cause the motor to operate in opposite directions when the motor contacts are respectively engaged by the lug contacts and thereby cause the accumulator speed to increase and decrease as the conveyor load respectively increases and decreases.

8. Conveyor load weighing apparatus comprising a fulcrumed scale beam normally in a neutral position and to which is operatively connected a weighing frame having spaced rollers over which a conveyor belt runs when the apparatus is in operation, load weight accumulator apparatus with a driving cone rotated in accordance with the speed of the conveyor belt, a rotatable shaft forming part of and projecting from the accumulator apparatus and extending substantially parallel to a conical surface of the cone, a wheel slidably mounted on and rotatable with said shaft and bearing against said cone surface, a carrier slidably mounted for movement parallel with said shaft and adapted to move the wheel with the carrier to shift said wheel over the cone surface to increase and decrease the speed of operation of the accumulator apparatus, a reversible electric motor, means operated by said motor and connected to the carrier for shifting the wheel over said cone surface, resilient means connected to the carrier and the scale beam to counterbalance the conveyor load on the weighing frame, and switch means for controlling the motor closable by a very small movement of the beam from its neutral position as the conveyor load increases and decreases to cause the motor to shift the carrier and thereby move the wheel over the cone surface as the conveyor load increases and decreases respectively to increase and decrease the speed of operation of the accumulator, said resilient means being moved by the carrier to move the beam back to its normal position to open the switch means immediately after each change in the conveyor load.

9. Conveyor load weighing apparatus as claimed in claim 8 in which said resilient means comprises a spring connected at one end to the carrier and at an opposite end to the scale beam.

10. Conveyor load weighing apparatus as claimed in claim 8 in which the weighing frame is connected to the scale beam near the fulcrum of the latter.

11. Conveyor load weighing apparatus as claimed in claim 8 in which said resilient means comprises a spring connected at one end to the carrier and at an opposite end to the scale beam spaced from the fulcrum thereof, and the weighing frame is connected to said beam near said fulcrum and between the latter and said spring.

12. Conveyor load weighing apparatus as claimed in claim 8 in which said switch means comprises a lug projecting from the beam and spaced from the fulcrum thereof, a contact on each of two opposite faces of the lug, a stationary motor contact normally spaced slightly from each lug contact and in circuit with the motor, said motor contacts being adapted to cause the motor to operate in opposite directions when the motor contacts are respectively engaged by the lug contacts to shift the wheel back and forth over the cone surface, said resilient means on being moved by the carrier moving the beam back to its neutral position to separate the lug and motor contacts immediately after each change in the conveyor load.

13. Conveyor load weighing apparatus as claimed in claim 8 in which the means operated by the motor comprises a rack connected to the carrier, and a pinion rotated by the motor and meshing with said rack.

References Cited by the Examiner
UNITED STATES PATENTS

| | | | |
|---|---|---|---|
| 1,257,376 | 2/1918 | Merrick | 177—17 |
| 2,228,068 | 1/1941 | White | 177—16 X |
| 2,285,719 | 6/1942 | Jerome et al. | 177—16 |
| 2,301,177 | 11/1942 | Hadley | 177—16 |

RICHARD B. WILKINSON, *Primary Examiner.*

G. H. MILLER, *Assistant Examiner.*